UNITED STATES PATENT OFFICE.

THOMAS RICHARD TERENCE MAURICE, OF NEW YORK, N. Y.

FOOD PRODUCT.

1,163,433.    Specification of Letters Patent.    Patented Dec. 7, 1915.

No Drawing.    Application filed August 19, 1914.   Serial No. 857,580.

*To all whom it may concern:*

Be it known that I, THOMAS RICHARD TERENCE MAURICE, a subject of the King of England, and residing in the city, county, and State of New York, have invented a new and useful Food Product, of which the following is a specification.

My invention relates to food products and particularly to a food for animals, the object of my invention being to utilize and convert into available food material the waste now commonly incident to the commercial use of the so-called vegetable ivory nut, viz., the hard seed of the *Phyteleplias macrocarpa* and African dum nut. This nut is the fruit of a tree resembling the palm and found in New Granada, Isthmus of Darien, South Africa, and perhaps elsewhere. In its fully ripened condition this seed forms a solid, hard, white nut somewhat larger than a walnut. It is used in large quantities by button manufacturers, but owing to its irregular elliptical shape, there is a large percentage of waste (as much as 80%) incident to the process of manufacture. This waste has heretofore been practically valueless, since its only common use has been as a starting fuel for fires. It burns easily with a very hot flame and with very little ash. I now propose to use this waste material as the basis of a food product. While this nut is so hard as to be absolutely indigestible and inedible in the fragmentary form in which it is received from the button factory as waste, I have discovered that when it is ground into a fine flour it is readily attacked by the digestive fluids and becomes a very readily digested and nutritious substance.

In the form in which I prefer to use it, the nut scraps are reduced to a flour closely approaching in fineness and texture commercial whole wheat flour, much finer than ordinary corn meal, and having a grayish white color, due in part to the presence of the comminuted skin of the nut, which is of a brownish color. An analysis of this substance shows approximately:—

| | |
|---|---|
| Moisture | 10.70% |
| Crude fat (ether extract) | 1.22% |
| Crude protein | 4.31% |
| Crude fiber | 6.27% |
| Carbohydrates (mannan) | 76.30% |
| Ash | 1.20% |
| | 100.00% |

The value of the article as a food for cattle, etc., is obvious in view of its large carbohydrate percentage. This percentage is, as a matter of fact, too high for a properly balanced stock food, and I have found that it may be advantageously combined with foods having high protein values, such as cotton seed meal for instance. It may also be combined to advantage with bran for horse feeding. As a dog biscuit it may be mixed with water, an agglutinant such as flour, and soda or other ingredients, and baked into a hard biscuit which is eagerly eaten and beneficial. It is perfectly digestible by man, but is not particularly palatable by itself, though it may be made so by suitably combining it with other substances, such as corn meal, rye meal, etc. Various other uses of the material will readily occur to those familiar with food stuffs.

I claim as my invention:—

1. As a new product, a food stuff comprising comminuted vegetable ivory and admixed food elements of suitable nature, the mixture being cooked into a biscuit or cake.

2. As a new product, a food stuff comprising comminuted vegetable ivory, a substance of relatively high protein value and admixed therewith, a moistening ingredient, the whole being cooked into a hard cake or biscuit.

In testimony whereof I have signed my name to this specification in the presence of two subscribing witnesses.

THOMAS RICHARD TERENCE MAURICE.

Witnesses:
  ROSWELL W. FROST,
  FLORENCE E. KANENT.